United States Patent [19]

Iwasaki

[11] Patent Number: 4,903,198
[45] Date of Patent: Feb. 20, 1990

[54] METHOD FOR SUBSTITUTING REPLACEMENT TRACKS FOR DEFECTIVE TRACKS IN DISC MEMORY SYSTEMS

[75] Inventor: Hiroshi Iwasaki, Kanagawa, Japan

[73] Assignee: Mitsubishi Denki Kabushiki Kaisha, Tokyo, Japan

[21] Appl. No.: 430,201

[22] Filed: Sep. 30, 1982

[30] Foreign Application Priority Data

Oct. 6, 1981 [JP] Japan ................................ 56-159169

[51] Int. Cl.$^4$ ............................................ G06F 11/20
[52] U.S. Cl. ..................................... 364/200; 360/47; 371/10.2; 364/248.1; 364/245.3; 364/265.3; 364/245.0; 364/267.0; 364/267.4; 364/268.0; 364/268.3; 364/268.5; 364/238.4
[58] Field of Search ... 364/200 MS File, 900 MS File; 371/38, 41, 53, 8, 10, 11, 13; 360/39, 49, 47

[56] References Cited

U.S. PATENT DOCUMENTS

| | | | |
|---|---|---|---|
| 3,689,891 | 9/1972 | Kril | 364/900 |
| 3,771,143 | 11/1973 | Taylor | 364/200 |
| 4,152,695 | 5/1979 | Democrate et al. | 360/47 |
| 4,310,901 | 1/1982 | Harding et al. | 365/200 |
| 4,405,952 | 9/1983 | Slakmon | 360/39 |
| 4,434,487 | 2/1984 | Rubinson et al. | 364/200 |
| 4,498,146 | 2/1985 | Martinez | 364/900 |

OTHER PUBLICATIONS

"800 MB/Spindle Magnetic Disk Storage System," Yonosuka Ito, et al., Japan Telecom. Review, Jan. 1980.
"Increased Direct-Access Storage Device Yield Through Defective Track Handling in Hardware," IBM Technical Disclosure Bulletin, vol. 24, No. 1B, Jun. 1981.
"Track Selection in Rotating Medium Stores," C. E. Owens, IBM Technical Disclosure Bulletin, vol. 12, No. 12, May 1970.
"Translator Smooths Integration of Disk Drives and Systems," Electronic Design, vol. 28, Oct. 1980.
Decision by European Patent Office denying the opposition.

Primary Examiner—Gareth D. Shaw
Assistant Examiner—Jonathan C. Fairbanks
Attorney, Agent, or Firm—Sughrue, Mion, Zinn, Macpeak & Seas

[57] ABSTRACT

A magnetic disc unit device controlling system and method are disclosed in which a magnetic disc unit controller for selecting any one of a plurality of magnetic disc units and exchanging information between a computer and a selected disc unit is provided with a memory for storing substitute track tables indicative of substitute track positions corresponding to defective tracks in the disc units. The substitute track table is accessed prior to sending positioning instructions to the selected disc unit. If a substitute track exists, the address of the substitute track is sent to the selected disc unit as a positioning instruction. If there is no substitute track, the received positioning information is passed to the selected disc unit as a positioning instruction.

4 Claims, 5 Drawing Sheets

METHOD FOR SUBSTITUTING REPLACEMENT TRACKS FOR DEFECTIVE TRACKS IN DISC MEMORY SYSTEMS

BACKGROUND OF THE INVENTION

It is common in the electronic computer field to provide for one central processing unit a plurality of magnetic disc units to thus provide a large external memory capacity. In such cases, a magnetic disc controller is provided between the magnetic disc units and an input-output processing device for controlling the magnetic disc units.

The operation of the magnetic disc controller is as follows. Referring to FIG. 1, when a central processing unit 1 is to transfer information stored in a first disc unit D1 to a main memory 2, the CPU 1 first actuates the input-output controller 3. Then the input-output controller transmits an instruction to the magnetic disc unit controller 4. In response to this instruction, the disc unit controller 4 selects the first disc unit D1 among the plural disc units D1 to Dn. Next, the positioning information is transmitted to the disc unit controller 4 from the input-output controller 3 to select a specific track of the disc unit D1 in which is stored the desired information. In accordance with the positioning information received from the input-output controller 3, the disc controller 4 sends a positioning instruction to the disc unit D1. After the positioning is completed, and when an interrupt indicating completion of the positioning operation is issued, an address field of a desired record is read from the track selected by the positioning operation.

It is usual that a plurality of records are present on one track. If a track is a defective track, the address field of one of the records of that track contains information indicating that the track is defective. When the information indicating a defective track is detected, an address of a substitute track is provided. In accordance with the substitute track address, positioning to the substituted track is performed. After a positioning completion interrupt has been received and the address field of the substitute track has been read, the data field following the substitute track address is read out. The read-out data is transferred through the input-output controller 3 to the main memory 2, sequentially. If it is decided during the defective track discrimination process that the track is a normal track, the data field following the track address is read out immediately.

The above-described positioning control system has some significant disadvantages. Specifically, since when the computer attempts to read or write a particular record at a designated address, it is not known whether the track location where the record is to be read from or written into is a defective location. Thus, the disc unit controller 4 has to (1) confirm whether or not the assigned track is defective, which takes about 30-100 ms, and, if so, (2) read out the substitute track address and then move to the indicated substitute track position, which takes about 10-20 ms. The extra time required to perform the two operations is very long compared with the time required to read out a data field in a good track, which takes only several milliseconds on the average. Especially, if a defective track is to be accessed frequently, the overhead time and processing time for accessing the desired information are very high.

Since the defect rate of tracks on a magnetic disc increases with the packing density of information stored on the disc, and as packing densities have been increasing due to increasing data storage requirements and improvements in magnetic disc operating systems, the above-described system has become particularly disadvantageous.

SUMMARY OF THE INVENTION

It is the primary object of the invention to eliminate the disadvantages inherent in the conventional system described above.

In accordance with this object, the invention provides a magnetic disc unit controlling system in which substitute track information is stored in a substitute track table of a controller so that, when the positioning instruction from a CPU corresponds to a defective track, repositioning is immediately performed directly to the substitute track without wasted positioning to the defective track and subsequent reading of the substitute track information.

DESCRIPTION OF THE PREFERRED EMBODIMENTS

Figure 1:
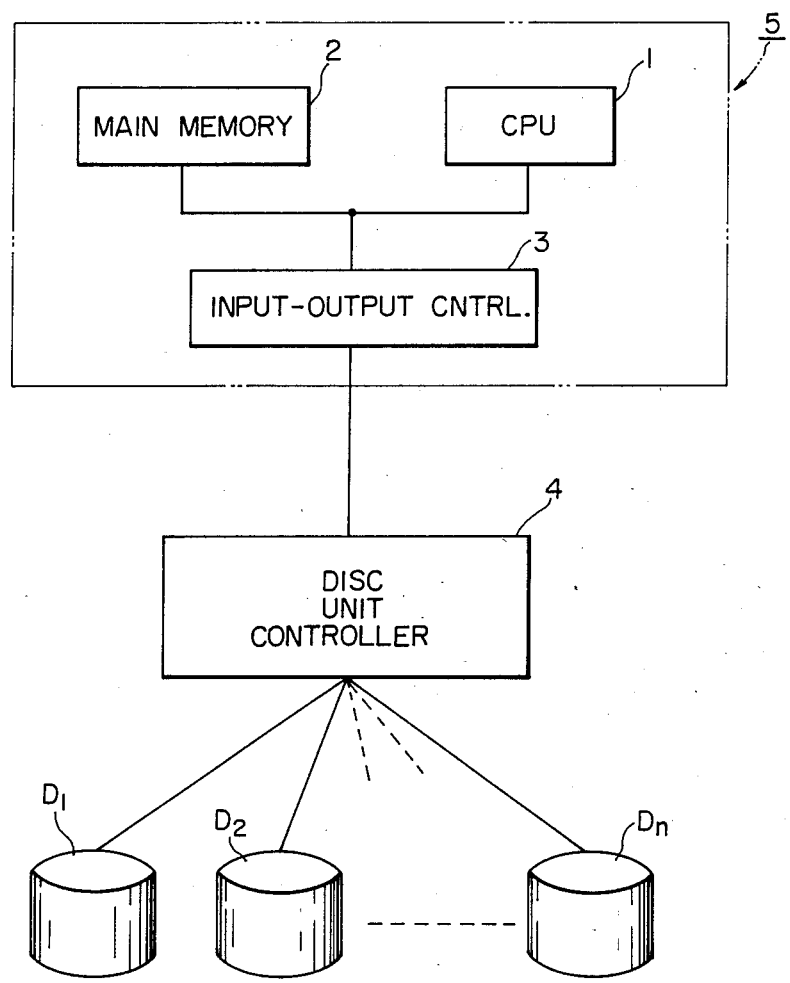
FIG. 1 is a block diagram illustrating a computer system including a prior art disc unit controlling system.
Figure 2:
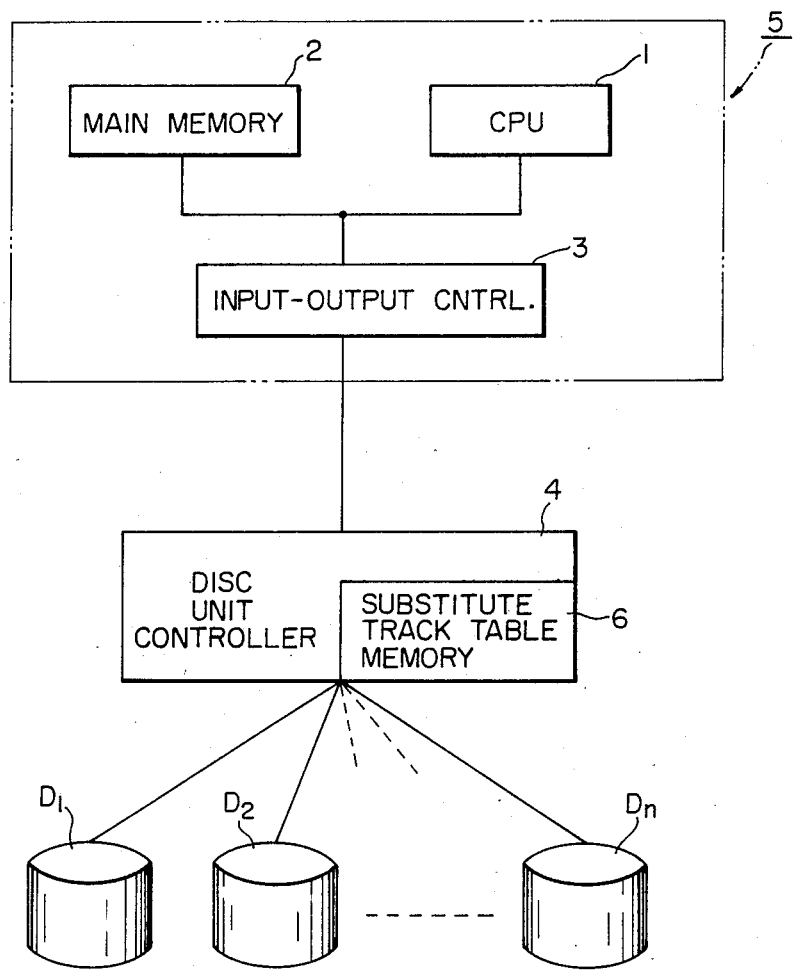
FIG. 2 is a block diagram illustrating a computer system including a disc unit controlling system of the invention.

In FIG. 2, which shows the construction of a computer system including a disc unit controlling system of the invention, a magnetic disc controller 4 is connected to a computer 5 which includes a CPU 1, a main memory 2 and an input-output controller 3, in the same manner in the arrangement of FIG. 1. The disc unit controller 4 is disposed between the input-output controller 3 and plural magnetic disc units D1 to Dn. In accordance with the invention, the disc unit controller 4 is provided with a memory 6 for storing substitute track tables for the disc units D1 to Dn.

Figure 3:
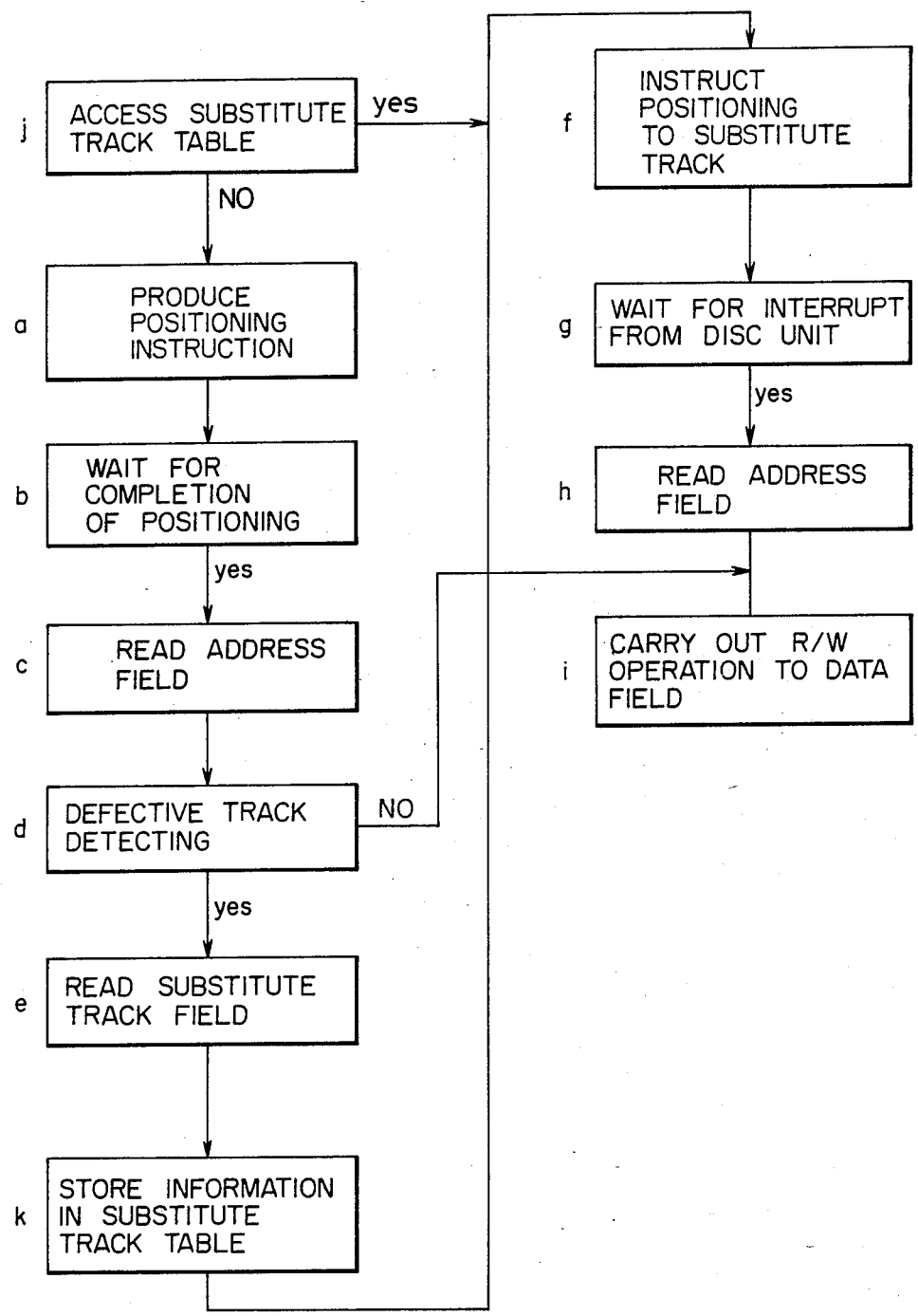
FIG. 3 is a flow chart showing the operation of a magnetic disc controller constructed according to the teachings of the present invention.
Figure 4:
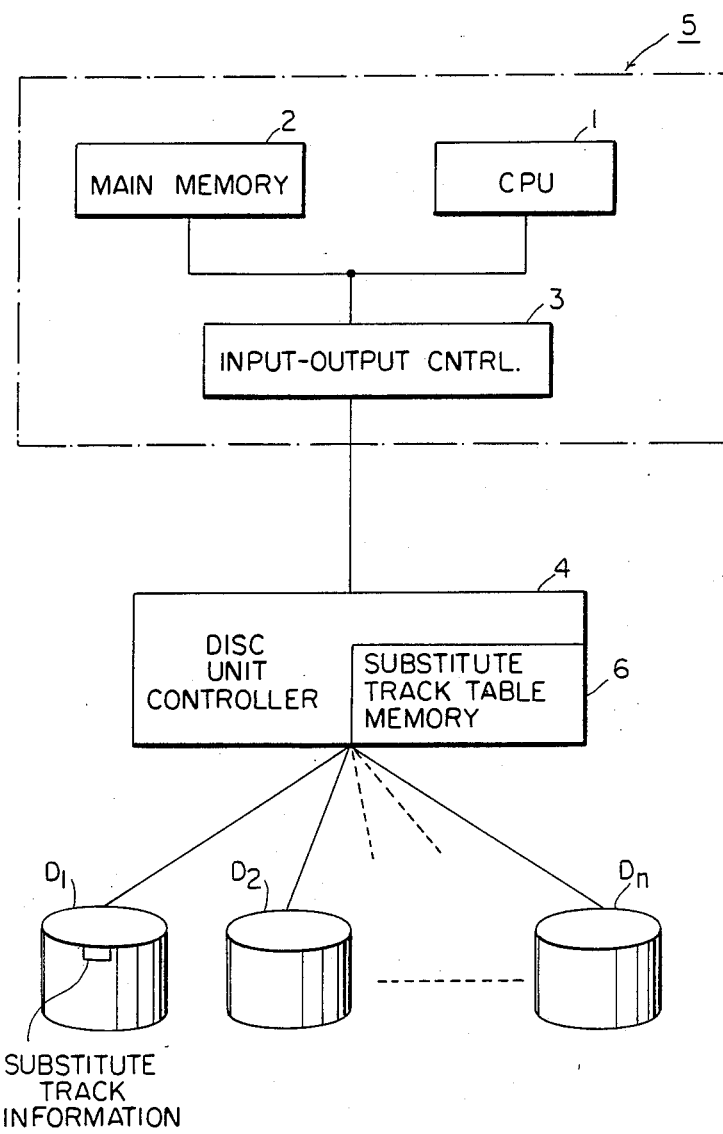
FIGS. 4 and 5 indicate alternative methods for storing substitute track tables.
Figure 5:
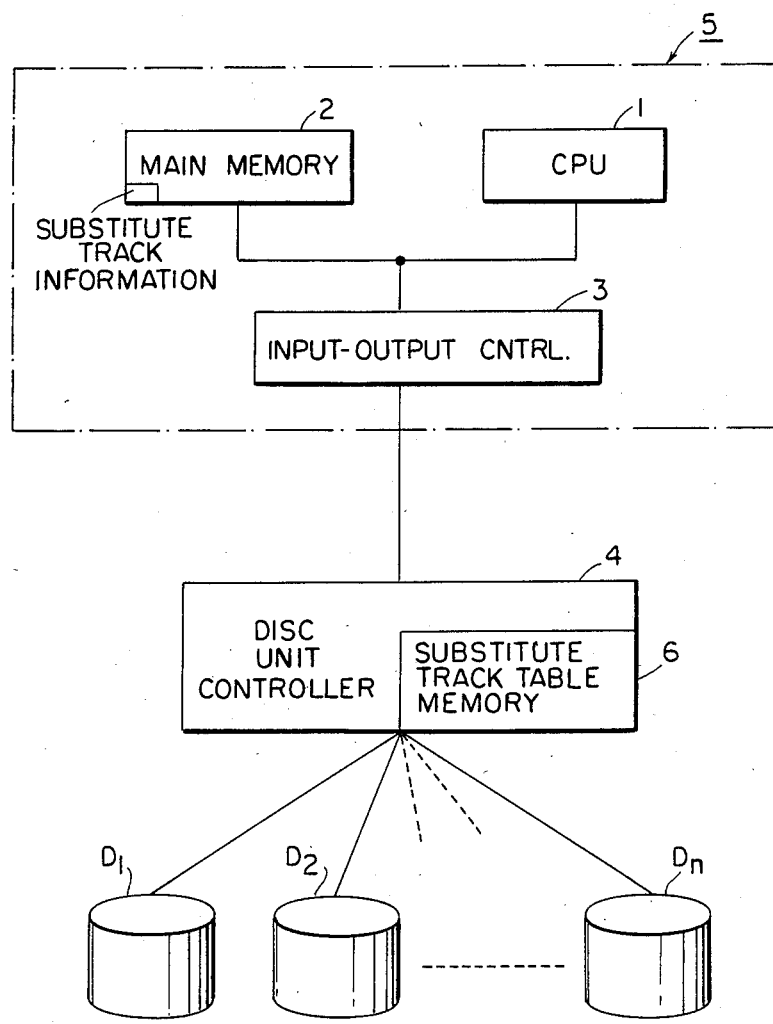

A case where the CPU 1 transfers information from the disc unit D1 to the main memory 2 for the processing will be described as an example with reference to FIGS. 2 and 3.

First, the disc unit controller 4 receives positioning information from the input-output controller 3, as in the previously described case. Before an positioning instruction based on the positioning information received from the input-output controller 3 is communicated to the disc unit D1, the disc controller 4 accesses (Step j) the substitute track table of the memory 6 corresponding to the disc unit D1 to determine whether or not there exists a substitute track for a track corresponding to the received positioning information. If such a substitute track exists, the disc unit controller 4 transfers (Step f) the substitute track information as the positioning instruction to the disc unit D1. If there is no substitute track, the disc unit controller 4 transfers (Step a) the received positioning information directly to the disc unit D1 as the positioning instruction, without modification. The disc controller 4 then waits (Step b) for completion of the positioning operation. When an interrupt is received from the disc unit D1 upon completion of positioning, the address field of a desired record is read out (Step c) from the selected track. Then a defective track detecting procedure is carried out (Step d). If an indication of a defective track is contained in the address field but is not registered in the substitute track table, a substitute track field in another field of the same track is read (Step e) to determine a substitute track for the defective track. Information indicative of the substitute track is then stored Step k) in the substitute track table at a location corresponding to the disc unit D1. Positioning to the substitute track is performed (Step f) according to the substitute track information. After waiting (Step g) for an interrupt from the disc unit D1 indicating completion of the positioning operation, the address field of the substitute track is read (Step h). Thereafter, the data field following this address field is read (Step i). The data read from this data field is transferred through the input-output controller 3 to the main memory 2 sequentially. If, on the other hand, it is determined (Step d) that the track is not defective, the data in the then following data field is read (Step i) immediately.

In this manner, before a positioning instruction is communicated to the designated disc unit, the disc unit controller accesses a substitute track table. If there is an indication of a substitute track for a desired track in the substitute track table, Steps a to e of FIG. 3 are omitted, resulting in a considerable improvement of the average processing speed of the computer system. Further, according to this invention, substitute track positions for defective tracks are stored in the substitute track table of the disc unit controller every time such defective tracks are detected. Therefore, almost all defective tracks are indicated in the substitute track table, and thus positioning to defective tracks is substantially entirely eliminated.

Although in the above description the storage of the substitute track information in the substitute track table is performed by reading the substitute track information from a substitute track storage field of a track when the address field of the same track is read and a defective track is identified and stored it in the substitute track table of the memory 6, this operation can also be performed by reading, from the magnetic disc unit, a substitute track table stored in a special field when the disc unit is switched on and storing it in the substitute track table in the memory 6 of the disc unit controller 4. Alternatively, it can be performed by transferring the substitute track table information from the computer 5 to the substitute track table.

What is claimed is:

1. A method for controlling magnetic disc units in a computer system including a main computer (5), a plurality of magnetic disc units ($D_1$-$D_n$), a disc unit controller (3) for transferring information between a selected one of said disc units ($D_1$-$D_n$) and said computer (5), and a substitute track table memory (6) for storing addresses of defective tracks in each of said magnetic disc units ($D_1$-$D_n$), said method comprising the steps of:

comparing in said disc unit controller (3) positioning information received from said computer (5) with entries in said substitute track table memory (6) before a positioning instruction based on said positioning information is communicated to the designated disc unit ($D_1$-$D_n$);

if an entry in said substitute track table memory corresponds to said positioning information, applying a positioning instruction to said selected disc unit corresponding to a substitute track position stored in said substitute track table memory (6);

and if no entry exists in said substitute track table memory (6) corresponding to said positioning information, determining whether or not a track position indicated by said positioning information is defective;

if said track position indicated by said positioning information is defective, storing substitute track information in said substitute track table memory (6) and transferring to said selected disc unit a positioning instruction corresponding to said substitute track information, said storing of said substitute track information in said substitute track memory being performed by transferring said substitute track information as a whole;

and if said track position indicated by said positioning information is not defective, transferring said positioning information to said selected disc unit ($D_1$-$D_n$) as a positioning instruction.

2. A method according to claim 1, wherein said storing of said substitute track information in said substitute track table memory (6) is performed by reading a substitute track field in another field of the same track.

3. A method according to claim 1, wherein said storing of said substitute track information in said substitute track table memory (6) is performed by reading a substitute track table stored in a predetermined field of the magnetic disc unit.

4. A method according to claim 1 wherein said storing of said substitute track information in said substitute track table memory (6) is performed by transferring said substitute track information from said computer (5).

* * * * *